(12) United States Patent
Kubata et al.

(10) Patent No.: US 7,258,947 B2
(45) Date of Patent: Aug. 21, 2007

(54) ELECTROLYTE FOR REDOX FLOW BATTERY, AND REDOX FLOW BATTERY

(75) Inventors: Michiru Kubata, Osaka (JP); Hiroyuki Nakaishi, Osaka (JP); Nobuyuki Tokuda, Osaka (JP)

(73) Assignees: Sumitomo Electric Industries, Ltd., Osaka (JP); The Kansai Electric Power Co., Inc., Osaka (JP)

( * ) Notice: Subject to any disclaimer, the term of this patent is extended or adjusted under 35 U.S.C. 154(b) by 430 days.

(21) Appl. No.: 10/479,710

(22) PCT Filed: Apr. 30, 2002

(86) PCT No.: PCT/JP02/04346

§ 371 (c)(1),
(2), (4) Date: Apr. 22, 2004

(87) PCT Pub. No.: WO02/101861

PCT Pub. Date: Dec. 19, 2002

(65) Prior Publication Data

US 2004/0191623 A1    Sep. 30, 2004

(30) Foreign Application Priority Data

Jun. 7, 2001    (JP) .............................. 2001-173158

(51) Int. Cl.
*H01M 6/00*   (2006.01)
(52) U.S. Cl. ...................... 429/122; 429/188; 429/314; 429/340; 429/201; 429/204
(58) Field of Classification Search ................ 429/122, 429/188, 314, 340, 201, 204
See application file for complete search history.

(56) References Cited

U.S. PATENT DOCUMENTS 5,587,132 A  * 12/1996  Nakajima et al. ............. 423/62

FOREIGN PATENT DOCUMENTS

| EP | 0 713 257 A1 | 5/1996 |
|---|---|---|
| JP | 60-115174 A | 6/1985 |
| JP | 2994210 | 3/1996 |
| JP | 8-148177 A | 6/1996 |
| JP | 2724817 | 12/1997 |
| JP | 11-79748 A | 3/1999 |
| JP | 3078186 | 6/2000 |
| JP | 2000-247643 A | 9/2000 |
| JP | 2000-247645 A | 9/2000 |
| JP | 2001-27223 A | 1/2001 |
| JP | 2001-57223 A | 2/2001 |
| WO | WO95/12219 | 5/1995 |

* cited by examiner

*Primary Examiner*—Patrick Joseph Ryan
*Assistant Examiner*—Jane Rhee
(74) *Attorney, Agent, or Firm*—McDermott Will & Emery LLP (57) ABSTRACT

The present invention provides electrolyte that can suppress reduction of battery efficiencies and capacities with increased cycles of charge/discharge of the battery, a method for producing the same, and a redox flow battery using the same electrolyte. The redox flow battery uses the electrolyte having a $NH_4$ content of not more than 20 ppm and a relation of Si concentration (ppm)×electrolyte quantity ($m^3$)/electrode area ($m^2$) of less than 5 ppm·$m^3/m^2$. By limiting a quantity of contaminants in the electrolyte, a clogging of carbon electrodes to cause reduction of the battery performances with increased charge/discharge operations can be suppressed.

5 Claims, 9 Drawing Sheets

Fig. 9

ELECTROLYTE FOR REDOX FLOW BATTERY, AND REDOX FLOW BATTERY

TECHNICAL FIELD

The present invention relates to electrolyte for a vanadium redox flow battery, to a method for producing the same, and to a redox flow battery using the same electrolyte.

BACKGROUND ART

It is known about electrolyte for a vanadium redox flow battery that when contaminants such as Si compound are mixed in the electrolyte in the production process, the electrolyte has a detrimental effect on a membrane of the redox flow battery. Japanese Laid-open (Unexamined) Patent Publication No. Hei 8-148177 (U.S. Pat. No. 3,085,634) discloses that when the contaminants are removed from the electrolyte by a method outlined below, the detrimental effect on the membrane can be avoided.

"After ammonium metavanadate is completely dissolved in a neutral or alkaline condition, it is acidified to deposit polyvanadium compound, so that the polyvanadium compound thus obtained is used as raw material of electrolyte.

Although the Si compound is mixed in the process of producing the polyvanadium, since the electrolyte is prevented from being gelled even in an acid condition by limiting the concentration of the Si component to 1,000 ppm or less, or preferably 500 ppm or less, durability of the membrane is improved."

This conventional technique has the following problems, however.

During repeated charge and discharge operations, contaminants gradually clog carbon electrodes in the battery cell or are adsorbed on the carbon electrode. For example, ammonium-vanadium compounds are deposited in the electrolyte, so that a flow of or a circulation of electrolyte is hindered by those deposited compounds.

As a result of this, the battery gradually becomes less efficient and eventually becomes inoperative to charge and discharge.

Also, in the technique disclosed by Japanese Laid-open (Unexamined) Patent Publication No. Hei 8-148177 cited above, since $NH_4$ is removed insufficiently, the battery efficiencies are reduced to eventually cause inoperativeness of charge and discharge of the battery, as mentioned above. Also, this publication discloses the limitation of the concentration of Si in the raw material of the electrolyte, but does not at all refer to the concentration of Si in the electrolytic solution produced by using such a raw material. Further, it defines only the limitation of the concentration of Si, but does not give any consideration to a quantity of electrolyte used for the battery and to a relationship between area of electrode and absolute quantity of contaminants.

It is an object of the present invention to provide electrolyte that can suppress reduction of battery efficiencies and capacities with increased charge/discharge cycles of the battery, a method for producing the same, and a redox flow battery using the same electrolyte.

DISCLOSURE OF THE INVENTION

After having analyzed and studied the cause of reduction of the battery efficiencies or inoperativeness of charge and discharge, the inventors have found the fact that reduction of the battery performances can be suppressed over a long term by specifying $NH_4$ concentration.

The inventors have also found the fact that the object mentioned above can also be accomplished by specifying Si concentration in association with electrolyte quantity and electrode area.

<Electrolyte>

Electrolyte for redox flow battery of the present invention is characterized in that it has a $NH_4$ content of not more than 20 ppm.

By limiting the $NH_4$ content to a specific value, deposition of ammonium-vanadium compounds in the electrolyte is suppressed, whereby a clogging of carbon electrodes or an adsorption phenomenon to cause reduction of the battery performances is suppressed. On the other hand, when the electrolyte has a $NH_4$ content of more than 20 ppm, the ammonium-vanadium compounds are deposited in the electrolyte easily so that an electrolyte circulation channel may often be clogged by them.

Further, it is preferable that the redox flow battery electrolyte further has a Si content of not more than 40 ppm, or preferably not more than 10 ppm. Since Si is also related with a long-term performance stability of the redox flow battery, it is preferable that the electrode has a possible lowest Si concentration.

In the electrolyte having this specified concentration of contaminant, it is also preferable that a vanadium ion concentration is in the range of 1 to 3 mol/L, a free sulfuric acid concentration is in the range of 1 to 4 mol/L, and a phosphoric acid concentration is in the range of $10^{-4}$ to 0.71 mol/L. The electrolyte having a vanadium ion concentration in the range of 1 to 3 mol/L is the electrolyte comprising stable compositions (See Japanese Laid-open (Unexamined) Patent Publication No. 8-64223). Proper concentrations of free sulfuric acid and phosphoric acid vary, depending on the concentration of vanadium ion. The combination of the vanadium ion concentration with the free sulfuric acid concentration and the phosphoric acid concentration as specified above can make it hard for the vanadium ion compounds to be deposited in the electrolyte, thus maintaining the battery performances over a long term.

<Method for Producing the Electrolyte>

The electrolyte containing contaminant of a specified concentration may be produced by provision of a chemical or physical refining process during the preparation of electrolyte or may be produced by the method outlined below after the preparation of electrolyte.

(1) Contaminants are removed by filtering the electrolyte through a filter having a pore size of not more than 0.5 μm.

The filters are roughly classified into a depth filter and a screen filter, due to difference in contaminant capturing mechanism. The depth filter is designed to capture solid materials in an interior portion of the filter, and a wind filter can be cited as an example of the depth filter. The screen filter is designed to capture solid materials on a surface of the filter, and a pleated filter can be cited as an example of the screen filter. While both filters can remove the contaminants from the electrolyte, the pleated filter is preferably used for the removal of the contaminants in the present invention. The pleated filter is a cartridge filter comprising a porous film pleated and formed into a cylindrical shape.

(2) A charge and discharge operation is previously performed by using a filtering cell having an equivalent structure to an operating cell practically used as the redox flow battery.

The cell having the electrode comprising a woven or non-woven carbon fiber cloth or equivalent is used in the redox flow battery. The deposited materials are captured by such an electrode during the real battery operation. Accordingly, a filtering cell designed specifically for capturing the deposited materials may be incorporated in the cell before the cell operates as the battery so that the deposited materials can be captured by the filtering cell. Thereafter, the filtering cell may be replaced with a proper operating cell.

The filtration of the electrolyte through the filter and the circulation of the electrolyte through the filtering cell should preferably be performed immediately before the electrolyte is introduced to the redox flow battery.

<Relationship Among Electrolyte Quantity, Electrode Area and Contaminant Quantity>

The redox flow battery can control its time capacity by adjusting electrolyte quantity. It was found this time that as a value determined from a relation of contaminant concentration (ppm)×electrolyte quantity ($m^3$)/electrode area ($m^2$) increases, the battery performance gradually deteriorates. Accordingly, it is preferable that the redox flow battery uses the electrolyte having a $NH_4$ content of not more than 20 ppm and a relation of Si concentration (ppm)×electrolyte quantity ($m^3$)/electrode area ($m^2$) of less than 5 ppm·$m^3$/$m^2$. It is to be noted here that the term "electrolyte quantity" means a total volume of electrolytic solution of positive electrolyte or negative electrolyte, and the term "electrode area" means a total area of electrodes of positive electrodes or negative electrodes of the cells stacked in layered to form a so-called cell stack.

It was also found that a value determined from the relation between a quantity of contaminant in electrolytic solution and electrode area and electrolyte quantity is deeply related to the battery performance. For example, for a redox flow battery of 100-kW and 8 hour capacity, an approximately 25 $m^3$ electrolyte having a vanadium ion concentration of 2 mol/L is required for each of the positive electrolyte and the negative electrode. For this redox flow battery, the contaminants of e.g. 500 ppm amounts to 100 ppm·$m^3$/$m^2$, thus causing a clogging of the electrodes in the battery cell or an adsorption in the electrodes and thus exerting a bad influence on reaction of the battery. However, for a redox flow battery of 100-kW and 10 minute capacity, an approximately 0.5 $m^3$ of electrolyte is required for each of the positive electrolyte and negative electrolyte, and the contaminant of 500 ppm amounts to only 2 ppm·$m^3$/$m^2$, thus causing substantially no deterioration of battery performance and causing no practical problem.

For prevention of deterioration of the redox flow battery over a long term, the redox flow battery should preferably use the electrolyte having a relation of Si concentration (ppm)×electrolyte quantity ($m^3$)/electrode area ($m^2$) of less than 5 ppm·$m^3$/$m^2$, preferably 3 ppm·$m^3$/$m^2$ or less, or further preferably 2.5 ppm·$m^3$/$m^2$ or less, as well as a $NH_4$ content of not more than 20 ppm.

<Redox Flow Battery>

The redox flow battery using the electrolyte mentioned above can develop its battery performance effectively. The structure of the battery itself is the same as that of the conventional redox flow battery.

For application of the redox flow battery to load-leveling, backup measure for instantaneous voltage drop and backup power, the redox flow battery must be used in combination with a DC/AC converter to form a battery system. The redox flow battery defined herein includes not only a battery itself but also an inverter-controlled battery system.

BEST MODE FOR CARRYING OUT THE INVENTION

In the following, certain preferred embodiments of the present invention are described.

EMBODIMENT 1

Using 50-kW cell stacks, a system of an 1 hour capacity (electrolyte quantity: a volume of 1.5 $m^3$ for each of positive and negative electrolytes) and a system of an 8 hour capacity (electrolyte quantity: a volume of 12 $m^3$ for each of positive and negative electrolytes) were manufactured by way of trial.

Figure 1:
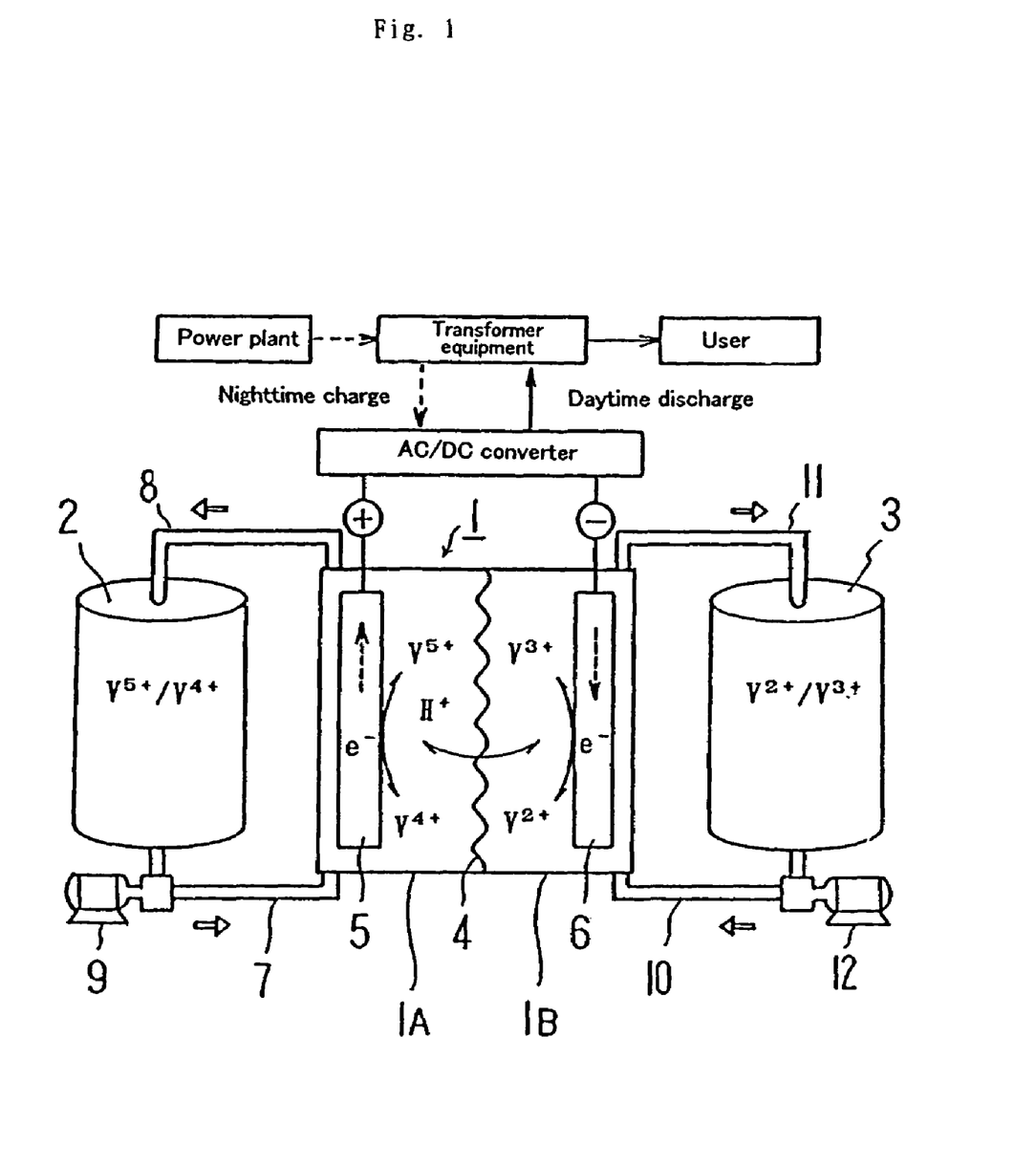
FIG. 1 is an explanatory view of an operating principle of a redox flow battery.

Before discussing this embodiment, an operating principle of a redox flow battery will be outlined with reference to FIG. 1 first, and then the structure of a cell stack will be described with reference to FIG. 2.

As illustrated, the redox flow battery has a cell 1 separated into a positive electrode cell 1A and a negative electrode cell 1B by a membrane 4 of an ion-exchange membrane. The positive electrode cell 1A and the negative electrode cell 1B include a positive electrode 5 and a negative electrode 6, respectively. A positive electrode tank 2 for feeding and discharging positive electrolytic solution to and from the positive electrode cell 1A is connected to the positive electrode cell 1A through conduit pipes 7, 8. Similarly, a negative electrode tank 3 for feeding and discharging negative electrolytic solution to and from the negative electrode cell 1B is connected to the negative electrode cell 1B through conduit pipes 10, 11. Aqueous solution containing ions that change in valence, such as vanadium ion, is used for the positive and negative electrolytes. The electrolyte containing the ions is circulated by using pumps 9, 12, to charge and discharge the electrolyte with the change in ionic valence at the positive and negative electrodes 5, 6. When the electrolyte containing the vanadium ions is used, the following reactions occur in the cell during the charge and discharge of electricity:

Positive electrode: $V^{4+} \rightarrow V^{5+} + e^-$ (Charge) $V^{4+} \leftarrow V^{5+} + e^-$ (Discharge)

Negative electrode: $V^{3+} + e^- \rightarrow V^{2+}$ (Charge) $V^{3+} + e^- \leftarrow V^{2+}$ (Discharge)

Figure 2:
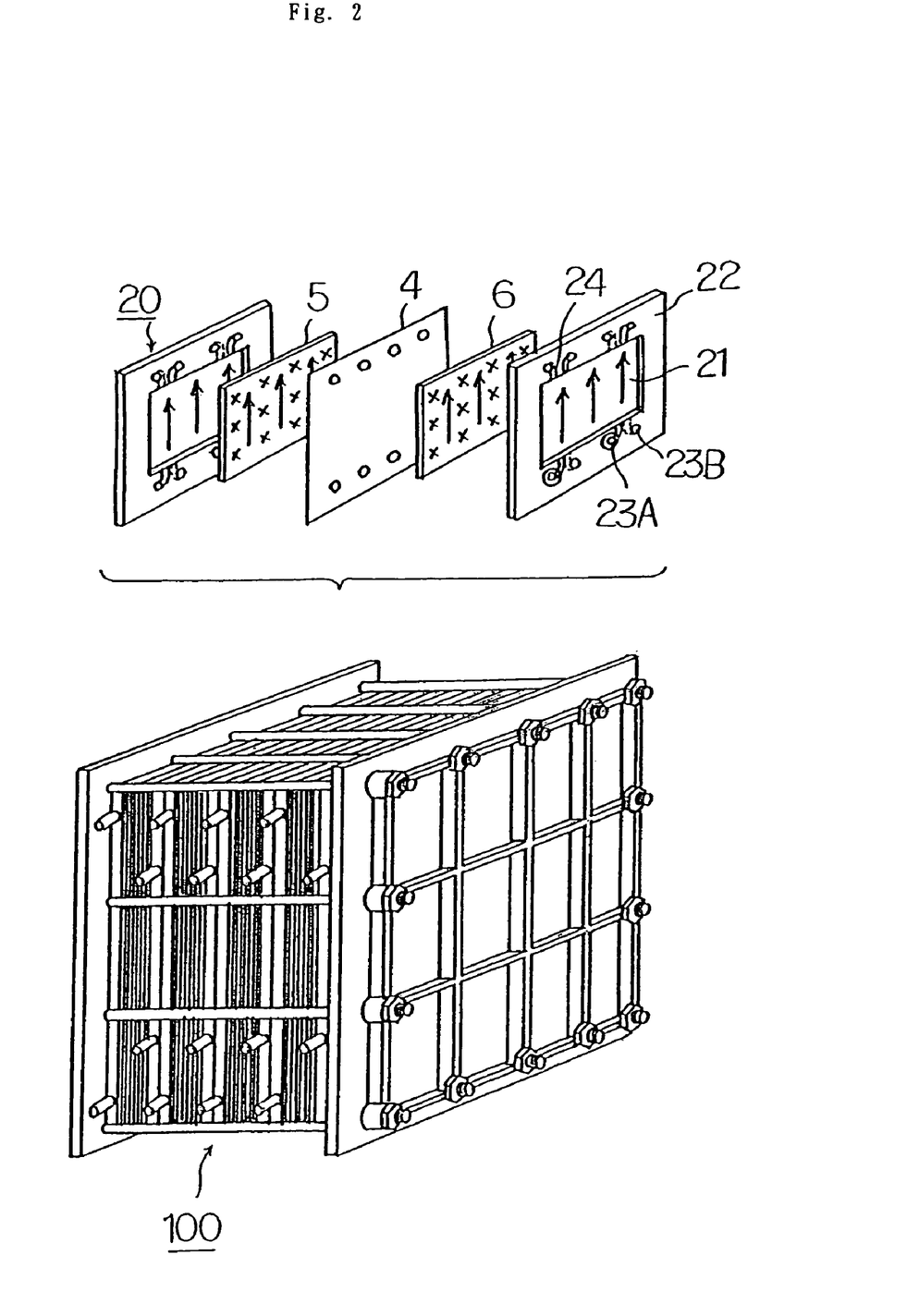
FIG. 2 is an illustration of construction of a cell stack of the redox flow battery.

FIG. 2 is a diagrammatic illustration of construction of a cell stack used for the battery mentioned above. This type of battery usually uses the construction which is called a cell stack 100 comprising a plurality of cells stacked in layers. Each of the cells has the positive electrode 5 and the negative electrode 6 which are made of carbon felt and disposed at both sides of the membrane 4. It also has cell frames 20 disposed at the outside of the positive electrode 5 and at the outside of the negative electrode 6, respectively.

Each of the cell frames 20 has a bipolar plate 21 made of carbon plastic and a frame 22 formed around the outside of the bipolar plate 21.

The frame 22 has a plurality of holes which are called manifolds 23A, 23B. Each of the cell frames has, for example, four manifolds formed on its lower side and four manifolds formed on its upper side or a total of eight manifolds. Two of the four manifolds on the lower side are for feeding the positive electrolyte and the remaining two on the lower side are for feeding the negative electrolyte. Two of the four manifolds on the upper side are for discharging the positive electrolyte and the remaining two on the upper side are for discharging the negative electrolyte. The manifolds 23A, 23B are arranged to form flow channels of the electrolytic solutions when a number of cells are stacked in layers and communicate with the conduit pipes 7, 8, 10, 11 of FIG. 1.

The electrolytes are circulated through the cell stack thus structured to do the charge/discharge cycle operation. The electrolytes containing the following main ingredients and contaminants were prepared. As to the concentrations of main ingredients in the electrolytes used, vanadium ion: 2.0 mol/L, free sulfuric acid: 2.0 mol/L, and added phosphoric acid: 0.14 mol/L. As to the concentration of contaminants, Si concentration was 4 ppm, and $NH_4$ concentrations were 40, 20 and 18 ppm. The concentrations of the contaminants were adjusted with a polypropylene pleated filter available from US Filter Corporation. A relationship between operation cycle number and electrolyte flow rates (at a constant pump pressure) was examined. The results are shown in a graph of FIG. 3. A rated charge was performed for the charge at a constant current of 80 mA/cm², and a rated discharge was performed for the discharge at a constant current of 80 mA/cm² for only a discharging time corresponding to the time capacity.

Figure 3:
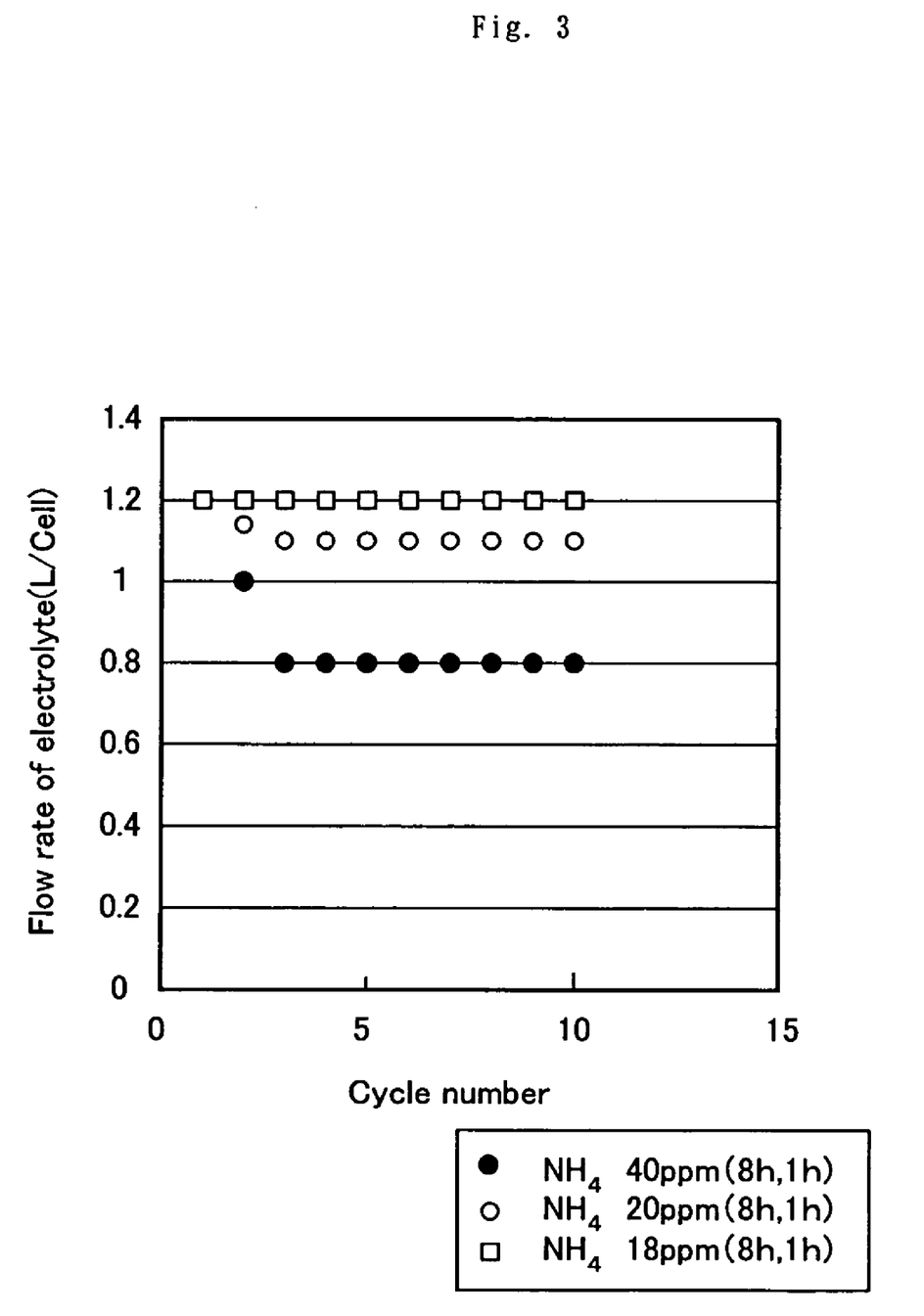
FIG. 3 is a graph showing a relationship between cycle number and electrolyte flow rate.

It was found from the results of FIG. 3 that in the case of the electrolyte containing $NH_4$ of 40 ppm, the electrolyte flow rate gradually reduced before five charge/discharge cycles, regardless of the time capacity, while on the other hand, in the case of the electrolyte containing $NH_4$ of 20 ppm or less, the electrolyte flow rate did not vary substantially for any time capacity.

EMBODIMENT 2

Using the 50-kW cell stack, a system of an 1 hour capacity was manufactured by way of trial and was tested by using three kinds of electrolytes given below. The electrolytes with a volume of 1.5 m³ for each of positive and negative electrolytes were used.

The electrolytes containing the following main ingredients and contaminants were prepared. As to the concentration of contaminants, $NH_4$ concentration was 18 ppm and Si concentrations were 100, 50, and 40 ppm. The concentrations of the contaminants were adjusted with the polypropylene pleated filter available from US Filter Corporation.

Figure 4:
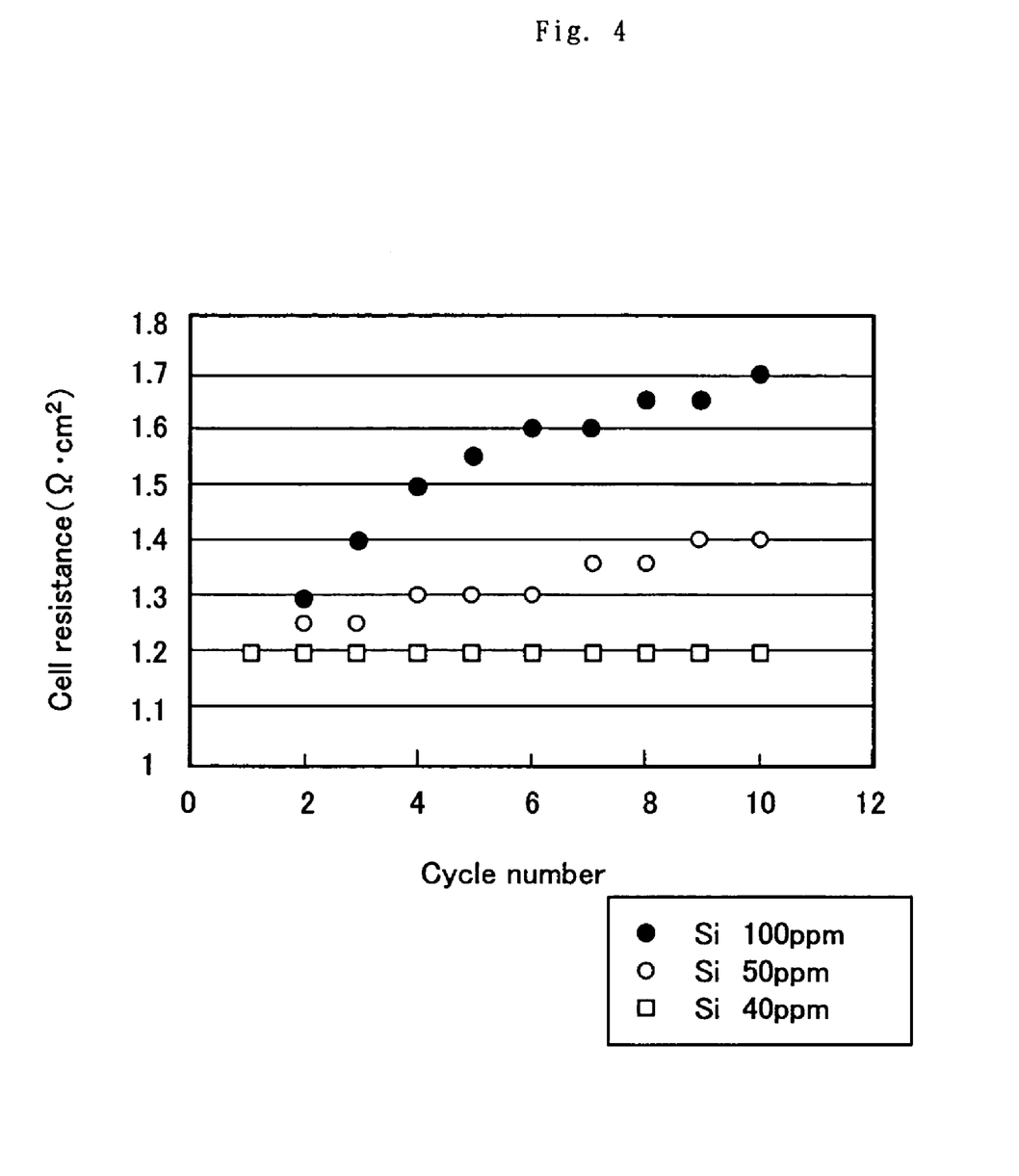
FIG. 4 is a graph showing a relationship between cycle number and cell resistance varied with difference in concentration of Si.

As to the concentrations of main ingredients in the electrolytes used herein, vanadium ion: 2.0 mol/L, free sulfuric acid: 2.0 mol/L, and added phosphoric acid: 0.14 mol/L. Changes in cell resistance ($\Omega \cdot cm^2$) at the respective Si concentrations are shown in FIG. 4. The charge/discharge conditions are the same as those in Embodiment 1.

It was found therefrom that in the case of the electrolyte containing Si of more than 40 ppm, the cell resistance increased so much before ten charge/discharge cycles that the battery system became inoperative with reduction of capacity of the battery, while on the other hand, in the case of the electrolyte containing Si of 40 ppm or less, the problems, such as resistance increase with increase in cycle number, were not produced.

EMBODIMENT 3

Figure 5:
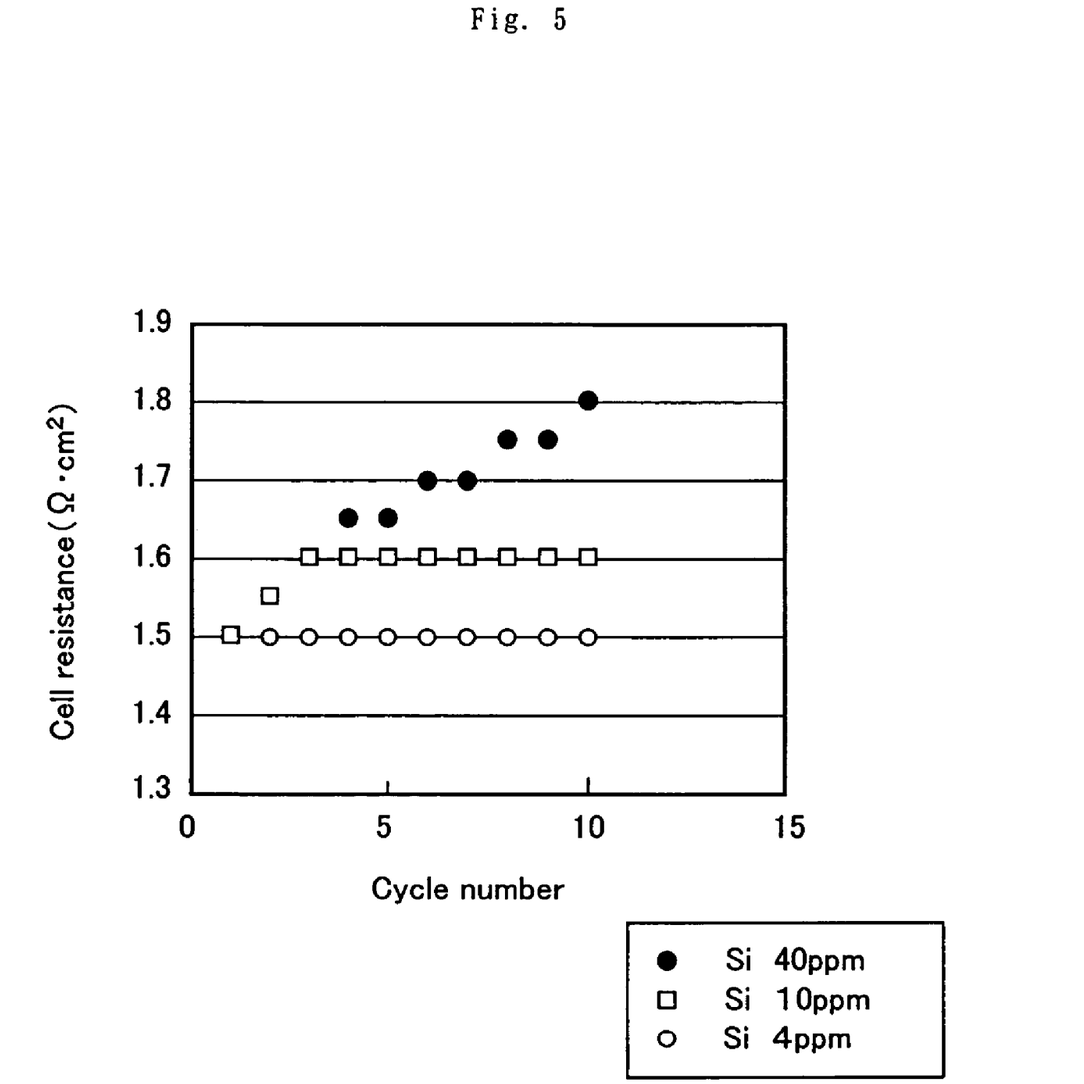
FIG. 5 is a graph showing a relationship between cycle number and cell resistance varied with difference in concentration of Si.

Using the 50-kW cell stack, a system of an 8 hour capacity (a volume of 12 m³ for each of positive and negative electrolytes) was manufactured by way of trial and a relationship between operation cycle number and cell resistance was examined. The electrolytes containing the following main ingredients and contaminants were prepared. As to the concentrations of main ingredients in the electrolytes used herein, vanadium ion: 1.7 mol/L, free sulfuric acid: 2.6 mol/L, and added phosphoric acid: 0.12 mol/L. As to the concentration of contaminants, $NH_4$ concentration was 20 ppm and Si concentrations were 4, 10, and 40 ppm. Changes in cell resistance ($\Omega \cdot cm^2$) at the respective Si concentrations are shown in FIG. 5. The charge/discharge conditions are the same as those in Embodiment 1.

It was found from the results of FIG. 5 that in the case of the electrolyte containing Si of 40 ppm, the cell resistance increased gradually, while on the other hand, in the case of the electrolyte containing Si of 10 ppm or less, the cell resistance did not change substantially.

EMBODIMENT 4

Using the 50-kW cell stack, a system of an 1 hour capacity was manufactured by way of trial and was tested by using three kinds of electrolytes given below. The electrolytes with a volume of 1.5 m³ for each of positive and negative electrolytes were used.

The electrolytes containing the following main ingredients and contaminants were prepared. As to the contaminant concentration, $NH_4$ concentration was 18 ppm and Si concentrations (ppm)×electrolyte quantity (m³)/electrode area (m²) were 0.2, 3, and 5 ppm·m³/m².

Figure 6:
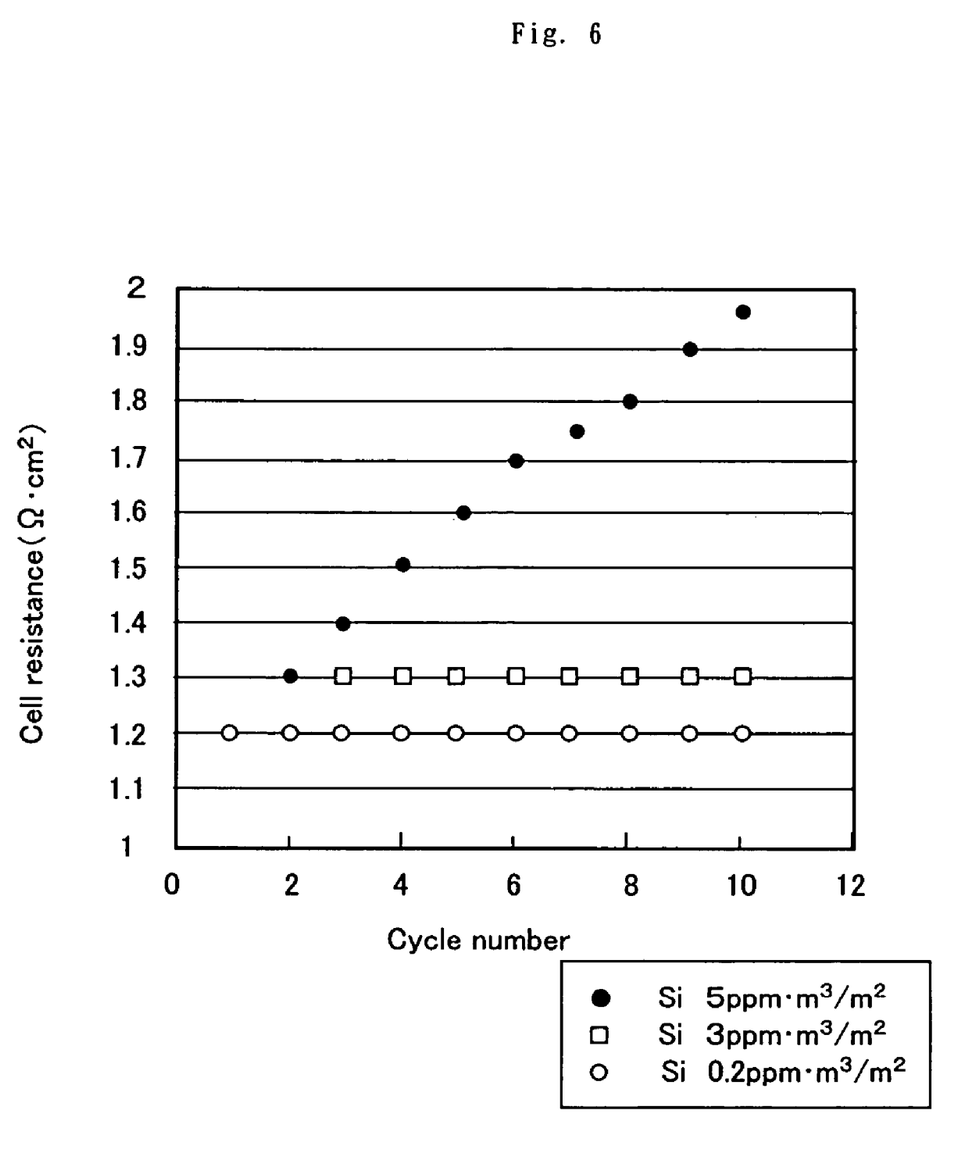
FIG. 6 is a graph showing a relationship between cycle number and cell resistance varied with difference in concentration of Si, electrode area, and electrolyte quantity.

As to the concentrations of main ingredients in the electrolytes used herein, vanadium ion: 2.0 mol/L, free sulfuric acid: 2.0 mol/L, and added phosphoric acid: 0.14 mol/L. Changes in cell resistance with the respective Si concentrations are shown in FIG. 6.

It was found therefrom that in the case of the electrolyte containing Si of 5 ppm·m³/m² or more, the cell resistance increased so much before ten charge/discharge cycles that the battery system became inoperative with reduction of capacity of the battery, while on the other hand, in the case of the electrolyte containing Si of 3 ppm·m$^3$/m$^2$ or less, the problems, such as resistance increase with increase in cycle number, were not produced.

EMBODIMENT 5

Using the 50-kW cell stack, a system of an 1 hour capacity was manufactured by way of trial and a relationship between cycle number and cell resistance was examined by using electrolytes filtered with a screen filter made of polypropylene and having a 0.5 μm mesh (a pleated filter available from US Filter Corporation). The charge/discharge conditions are the same as those in Embodiment 1.

The electrolytes containing the following main ingredients and contaminants were prepared. As to the concentrations of main ingredients in the electrolytes used herein, vanadium ion: 1.8 mol/L, free sulfuric acid: 2.3 mol/L, and added phosphoric acid: 0.13 mol/L. The electrolytes with a volume of 1.5 m$^3$ for each of positive and negative electrolytes were used. The electrolytes poured into the respective electrolyte tanks were filtered through the filters and circulated into their respective tanks through their respective circulation channels. The circulation of a total volume of electrode (1.5 m$^3$ for each) through its filter was defined as one cycle and a quantity of Si (ppm·m$^3$/m$^2$) in the electrolyte before circulation filtration and a quantity of Si (ppm·m$^3$/m$^2$) in the electrolyte after circulation filtration were examined. The results are shown in TABLE 1 given below.

TABLE 1

|  | Before filtration | After filtration |
| --- | --- | --- |
| 0 cycle (Conventional electrolytic solution) | 5 | — |
| 1.5 cycles (0.5 μm) | 5 | 2.5 |
| 1 cycle (0.5 μm) | 5 | 3 |
| 3 cycles (1.0 μm) | 5 | — |

Figure 7:
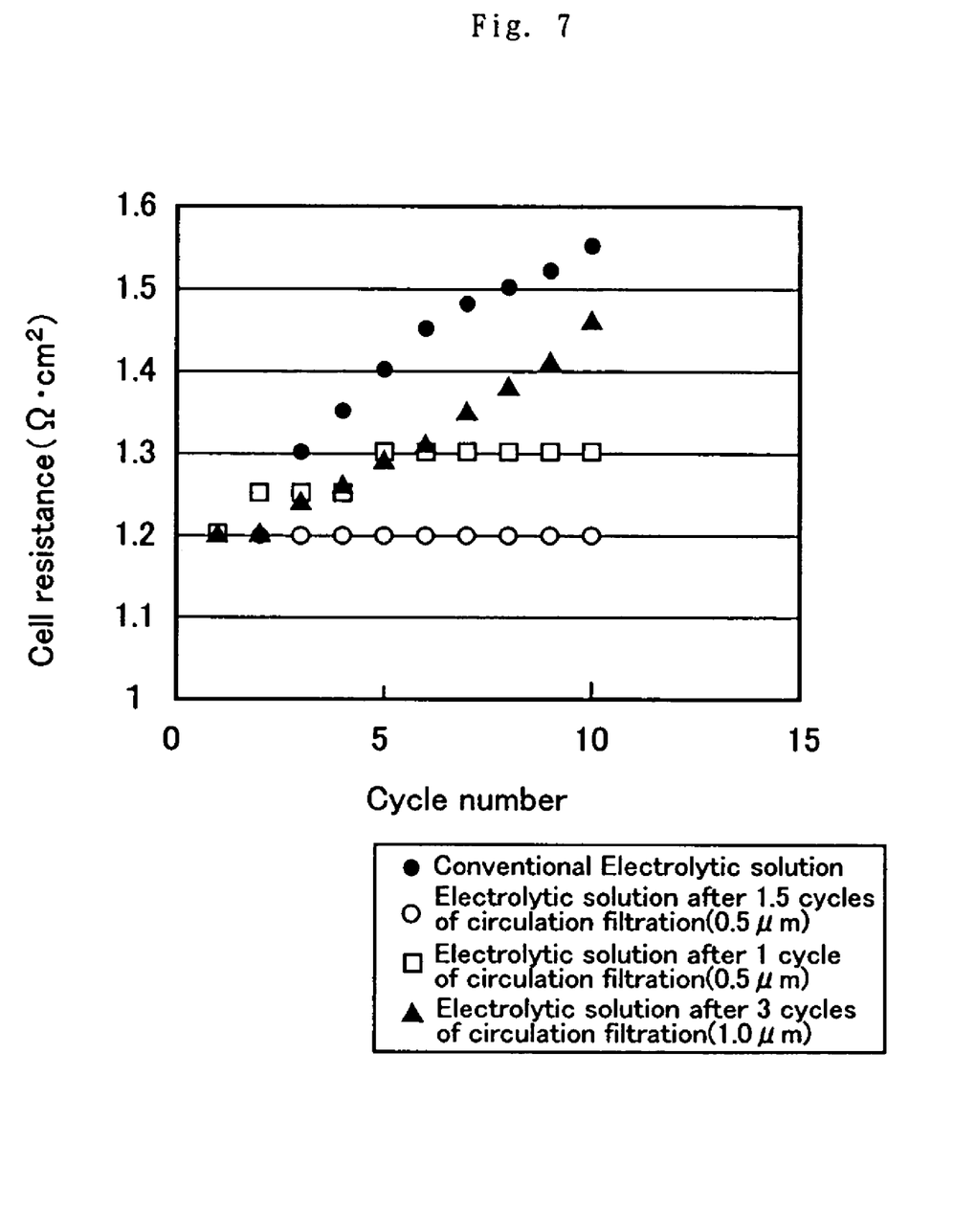
FIG. 7 is a graph showing a relationship between cycle number and cell resistance varied with difference in filters used.

Changes in cycle number and cell resistance when the electrolytes after filtration were used are shown in FIG. 7. It was found therefrom that in the case of the electrolyte before filtration, the cell resistance increased so much before ten cycles that the battery system became inoperative with reduction of the battery capacity, while on the other hand, in the case of the electrolyte after circulated 1.5 cycles through the filter of a pore size of 0.5 μm, the problems such as resistance increase were not produced with increase in cycle number.

It was to be noted, on the other hand, that in the case of the electrolyte filtered through the filter of a pore size of 1.0 μm, increase in cell resistance was still observed even when circulated three cycles.

It was presumed from this that when the electrolyte was filtered through the filter of a pore size of 0.5 μm, Si in colloidal-particle form having a particle size of 1.0 μm or less was removed and thereby the increase in cell resistance was prevented.

EMBODIMENT 6

Using the 50-kW cell stack, a system of an 1 hour capacity was manufactured by way of trial. After the charge and discharge operation was performed by use of a filtering cell, a cycle test was conducted by use of an additional operating cell. The charge/discharge conditions are the same as those in Embodiment 1. The filtering cell and the operating cell are identical cells having the same structure including the carbon-felt electrodes.

The electrolytes containing the main ingredients and contaminants were prepared. As to the concentrations of main ingredients in the electrolytes used herein, vanadium ion: 1.7 mol/L, free sulfuric acid: 2.6 mol/L, and added phosphoric acid: 0.12 mol/L. The discharge/charge operation using the filtering cell, one discharge operation and one charge operation for each operation, was defined as one cycle and a quantity of Si (ppm·m$^3$/m$^2$) in the electrolyte before the charge/discharge operation and a quantity of Si (ppm·m$^3$/m$^2$) in the electrolyte after the charge/discharge operation were examined. The results were as follows.

Conventional electrolytic solution (no charge/discharge operation via the filtering cell): 5

After one cycle: 3.2

After three cycles: 2.5

Figure 8:
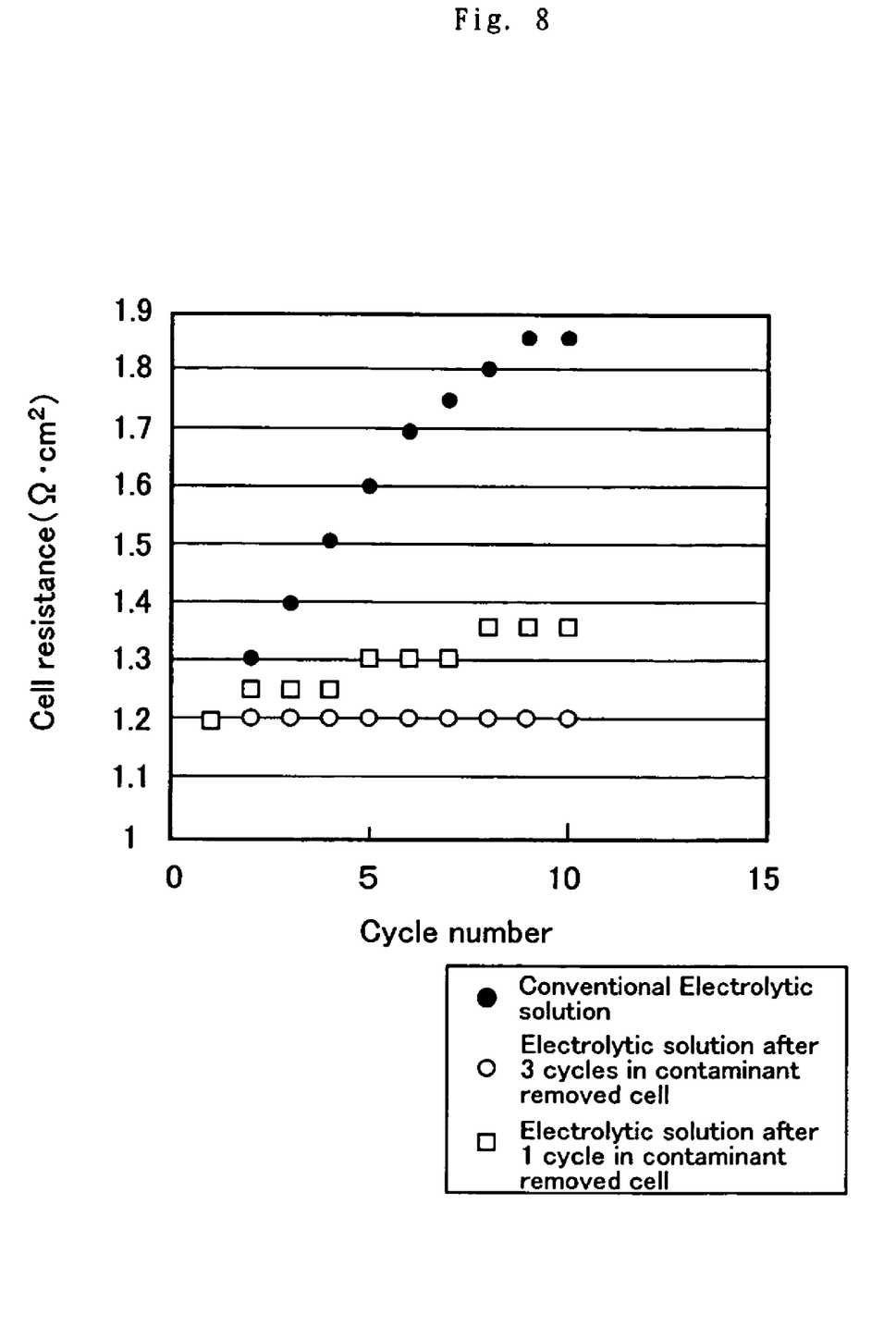
FIG. 8 is a graph showing a relationship between cycle number and cell resistance varied with difference in number of times of charge/discharge via a filtering cell used.

Changes in cycle number and cell resistance when those electrolytes were used and the charge/discharge operations were performed via the operating cell are shown in FIG. 8. It was found therefrom that in the case of the electrolytes that were not charged and discharged via the filtering cell, the cell resistance increased so much before ten cycles that the battery system became inoperative with reduction in battery capacity, while on the other hand, in the case of the electrolytes that were charged and discharged three times via the filtering cell, the problems such as resistance increase were not produced with increase in cycle number.

EMBODIMENT 7

Using the 50-kW cell stack, a system of an 8 hour capacity was manufactured by way of trial. The electrolytes having compositions shown in TABLE 2 were prepared to find out concentrations of free sulfuric acid and phosphoric acid at which no vanadium compound was deposited. In this embodiment, bivalent and quinquevalent electrolytic solutions which were in the charged state were produced from trivalent and quadrivalent electrolytic solutions which were in the discharged state. The electrolytic solutions of respective valences were allowed to stand for one month at 30° C., to examine the presence of the deposited vanadium composition. It was found from the results that independently of concentration of Si (ppm·m$^3$/m$^2$), proper selections must be made of concentration of vanadium ion, concentration of free sulfuric acid, and concentration of phosphoric acid. This is the case particularly when the concentration of Si (ppm·m$^3$/m$^2$) is high.

TABLE 2

| Vanadium ion (mol/L) | Free sulfuric acid (mol/L) | Phosphoric acid (mol/L) | Si (ppm · m$^3$/m$^2$) | Vanadium composition (one month at 30° C.) |
| --- | --- | --- | --- | --- |
| 2.5 | 1.0 | 0 | 2.3 | Not deposited |
| 2.5 | 1.0 | 0 | 4.0 | Not deposited |
| 2.5 | 1.0 | 0.2 | 2.3 | Not deposited |
| 2.5 | 1.0 | 0.2 | 4.0 | Not deposited |
| 2.5 | 1.0 | 0.25 | 2.3 | Deposited |
| 2.5 | 2.0 | 0 | 2.3 | Not deposited |
| 2.5 | 2.0 | 0 | 4.0 | Not deposited |
| 2.5 | 2.0 | 0.2 | 2.3 | Not deposited |
| 2.5 | 2.0 | 0.2 | 4.0 | Not deposited |
| 2.5 | 2.0 | 0.25 | 2.3 | Deposited |
| 2.5 | 3.0 | 0.2 | 2.3 | Deposited |
| 2.0 | 1.0 | 0 | 2.3 | Not deposited |
| 2.0 | 1.0 | 0 | 4.0 | Not deposited |
| 2.0 | 1.0 | 0.2 | 2.3 | Not deposited |
| 2.0 | 1.0 | 0.2 | 4.0 | Not deposited |
| 2.0 | 1.0 | 0.25 | 2.3 | Deposited |

TABLE 2-continued

| Vanadium ion (mol/L) | Free sulfuric acid (mol/L) | Phosphoric acid (mol/L) | Si (ppm · m³/m²) | Vanadium composition (one month at 30° C.) |
|---|---|---|---|---|
| 2.0 | 2.0 | 0 | 2.3 | Not deposited |
| 2.0 | 2.0 | 0 | 4.0 | Not deposited |
| 2.0 | 2.0 | 0.2 | 2.3 | Not deposited |
| 2.0 | 2.0 | 0.2 | 4.0 | Not deposited |
| 2.0 | 2.0 | 0.25 | 2.3 | Deposited |
| 2.0 | 3.0 | 0.2 | 2.3 | Deposited |
| 1.5 | 1.0 | 0 | 2.3 | Not deposited |
| 1.5 | 1.0 | 0 | 4.0 | Not deposited |
| 1.5 | 1.0 | 0.2 | 2.3 | Not deposited |
| 1.5 | 1.0 | 0.2 | 4.0 | Not deposited |
| 1.5 | 1.0 | 0.25 | 2.3 | Deposited |
| 1.5 | 2.0 | 0 | 2.3 | Not deposited |
| 1.5 | 2.0 | 0 | 4.0 | Not deposited |
| 1.5 | 2.0 | 0.2 | 2.3 | Not deposited |
| 1.5 | 2.0 | 0.2 | 4.0 | Not deposited |
| 1.5 | 2.0 | 0.25 | 2.3 | Deposited |
| 1.5 | 3.0 | 0.2 | 2.3 | Deposited |
| 1.0 | 1.0 | 0 | 2.3 | Not deposited |
| 1.0 | 1.0 | 0 | 4.0 | Not deposited |
| 1.0 | 1.0 | 0.2 | 2.3 | Not deposited |
| 1.0 | 1.0 | 0.2 | 4.0 | Not deposited |
| 1.0 | 1.0 | 0.25 | 2.3 | Deposited |
| 1.0 | 2.0 | 0 | 2.3 | Not deposited |
| 1.0 | 2.0 | 0 | 4.0 | Not deposited |
| 1.0 | 2.0 | 0.2 | 2.3 | Not deposited |
| 1.0 | 2.0 | 0.2 | 4.0 | Not deposited |
| 1.0 | 2.0 | 0.25 | 2.3 | Deposited |
| 1.0 | 3.0 | 0 | 2.3 | Not deposited |
| 1.0 | 3.0 | 0 | 4.0 | Not deposited |
| 1.0 | 3.0 | 0.2 | 2.3 | Not deposited |
| 1.0 | 3.0 | 0.2 | 4.0 | Not deposited |
| 1.0 | 3.0 | 0.25 | 2.3 | Deposited |
| 1.0 | 4.0 | 0 | 2.3 | Not deposited |
| 1.0 | 4.0 | 0 | 4.0 | Not deposited |
| 1.0 | 4.0 | 0.2 | 2.3 | Not deposited |
| 1.0 | 4.0 | 0.2 | 4.0 | Not deposited |
| 1.0 | 4.0 | 0.25 | 2.3 | Deposited |
| 1.0 | 4.1 | 0.2 | 2.3 | Deposited |

Then, a relation between cycle number and cell resistance was examined by using the following electrolytes in which no vanadium compounds were deposited. All of these electrolytes had the $NH_4$ concentrations of 20 ppm or less.

① Vanadium ion: 2 mol/L, Free sulfuric acid: 2 mol/L, Phosphoric acid: 0.14 mol/L, and Si: 2.3 ppm·m³/m², ①' Vanadium ion: 2 mol/L, Free sulfuric acid: 2 mol/L, Phosphoric acid: 0.14 mol/L, and Si: 8 ppm·m³/m², ② Vanadium ion: 1.7 mol/L, Free sulfuric acid: 2.6 mol/L, Phosphoric acid: 0.12 mol/L, and Si: 2.3 ppm·m³/m², and ②' Vanadium ion: 1.7 mol/L, Free sulfuric acid: 2.6 mol/L, Phosphoric acid: 0.12 mol/L, and Si: 8 ppm·m³/m².

Figure 9:
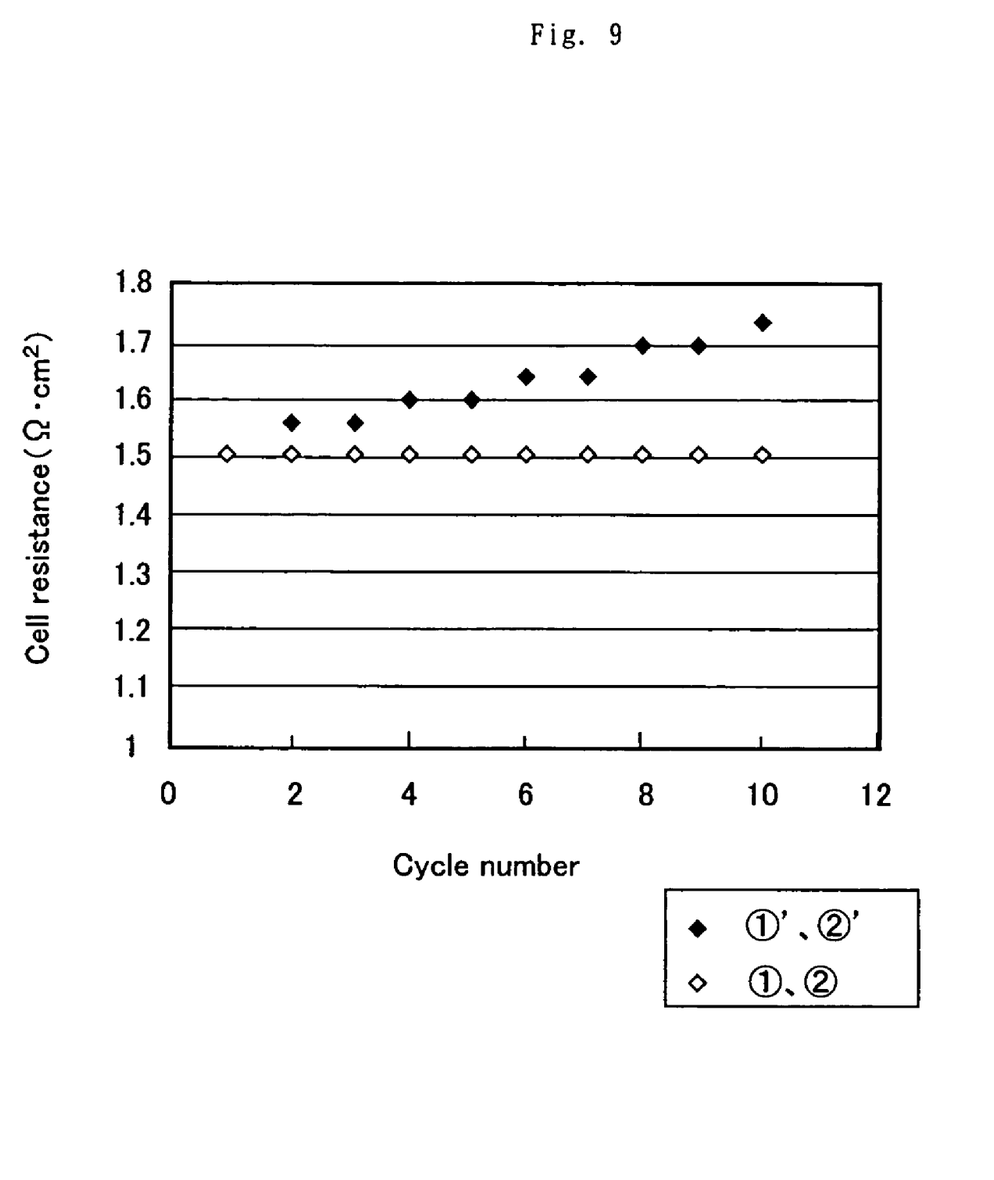
FIG. 9 is a graph showing a relationship between cycle number and cell resistance varied with difference in electrolyte.

The results are shown in a graph of FIG. 9. It was apparent as seen from this graph that even when the composition of the electrolyte is selected properly, consideration must be given to reduction in concentration of contaminants, for the long-term stability. It was also found from the continued operation of the battery that the use of the electrolytes of the compositions ①, ② could produce stable performances of the battery over a long term.

CAPABILITIES OF EXPLOITATION IN INDUSTRY

As discussed above, the electrolytes of the present invention can prevent the contaminants from clogging up carbon electrodes to cause reduction of the battery performances during the repeated charge and discharge operations by limiting a quantity of contaminants.

Also, the method for producing the electrolytes of the present invention enables the contaminant to be removed by filtration directly from the electrolyte whose primary compositions were adjusted, whereby the electrolytes with limited contaminants can be produced with ease.

Further, the redox flow battery of the present invention can maintain the stable battery performances over a long term by defining a relationship between quantity of contaminant contained in the electrolyte itself and electrolyte quantity and electrode area.

The invention claimed is:

1. Redox flow battery electrolyte having a $NH_4$ content of not more than 20 ppm, a vanadium ion concentration in the range of 1 to 3 mol/L, a free sulfuric acid concentration in the range of 1 to 4 mol/L, and a phosphoric acid concentration in the range of $10^{-4}$ to 0.71 mol/L.

2. The redox flow battery electrolyte according to claim 1 further having a Si content of not more than 40 ppm.

3. The redox flow battery electrolyte according to claim 2, wherein the Si content is not more than 10 ppm.

4. A redox flow battery using the electrolyte according to any of claims 1 to 3.

5. A redox flow battery using electrolyte having a $NH_4$ content of not more than 20 ppm and a relation of Si concentration (ppm)×electrolyte quantity (m³)/electrode area (m²) of less than 5 ppm·m³/m².

* * * * *